US009889372B2

(12) United States Patent
Sirois et al.

(10) Patent No.: US 9,889,372 B2
(45) Date of Patent: Feb. 13, 2018

(54) HIDDEN OBJECT LOTTERY GAME

(71) Applicant: Scientific Games International, Inc., Alpharetta, GA (US)

(72) Inventors: Jean-Louis Sirois, Dieppe (CA); Christopher Macleod, Moncton (CA)

(73) Assignee: Scientific Games International, Inc., Alpharetta, GA (US)

( * ) Notice: Subject to any disclaimer, the term of this patent is extended or adjusted under 35 U.S.C. 154(b) by 313 days.

(21) Appl. No.: 14/532,941

(22) Filed: Nov. 4, 2014

(65) Prior Publication Data

US 2016/0121205 A1    May 5, 2016

(51) Int. Cl.
| A63F 3/04 | (2006.01) |
| A63F 9/06 | (2006.01) |
| G07F 17/32 | (2006.01) |
| A63F 13/2145 | (2014.01) |
| A63F 13/69 | (2014.01) |

(52) U.S. Cl.
CPC .......... *A63F 9/0612* (2013.01); *A63F 3/0423* (2013.01); *A63F 13/2145* (2014.09); *G07F 17/32* (2013.01); *A63F 13/69* (2014.09); *A63F 2003/0428* (2013.01); *G07F 17/329* (2013.01)

(58) Field of Classification Search
CPC .... A63F 3/0423; A63F 3/0421; A63F 3/0415; A63F 9/0612; A63F 9/0613; A63F 9/0803; A63F 9/1208
See application file for complete search history.

(56) References Cited

U.S. PATENT DOCUMENTS

| 2014/0087797 A1* | 3/2014 | Siddharth | ............. A63F 13/005 463/9 |
| 2014/0235324 A1* | 8/2014 | Ryan | .................. G07F 17/3244 463/21 |
| 2014/0265123 A1* | 9/2014 | Morrow | ................ A63F 3/0423 273/272 |
| 2014/0273715 A1* | 9/2014 | Moll | .................... G06F 3/03545 446/146 |

\* cited by examiner

*Primary Examiner* — James S McClellan
*Assistant Examiner* — Syvila Weatherford
(74) *Attorney, Agent, or Firm* — Dority & Manning, P.A.

(57) ABSTRACT

Disclosed are systems, methods, devices, and non-transitory computer readable storage media for providing an electronic lottery scratchcard game. In particular, disclosed are electronic Hidden Object Puzzle games that combines the existing lottery mechanic of scratchcard games with the existing social genre of Hidden Object games. In a traditional scratchcard puzzle, a series of covered squares are scratched by the player to reveal symbols such as letters of the alphabet. In a Hidden Object game, a graphical user interface contains hidden objects that reveal symbols such as letters of the alphabet when selected by the user. Specific combinations of symbols such as words award monetary prizes.

8 Claims, 10 Drawing Sheets

HIDDEN OBJECT LOTTERY GAME

TECHNICAL FIELD

The present technology pertains to electronic games, and more specifically to lottery scratchcard games.

BACKGROUND

Lottery scratchcard games are a common lottery game enjoyed by many users. Typical lottery scratchcard games are sold as physical products made up of paper and latex. The user purchases the game from a retailer and scratches off the latex to determine if they have won a cash prize. If the game is a cash winner, the player takes their game back to the retailer to receive their cash award.

Computers and electronic devices are becoming a more popular way for users to enjoy a variety of their favorite games including board games, card games, video games, and in some instances lottery games. Electronic scratchcard games are becoming more common as lottery officials seek to increase lottery revenue and target the increasing audience of users that play games on computers and electronic devices. Lottery game players now have their choice of a host of online scratch-off lottery games, which serve as digital replicas of the actual paper lottery tickets they now buy at retailers.

Part of the enjoyment for many users that play lottery scratchcard games lies in the physical act of scratching off the latex to determine if they have won the cash prize. Electronic scratchcard games that serve as replicas of the actual paper lottery tickets struggle to provide the user with the same level of enjoyment experienced with physical lottery scratchcard tickets. Many users would like an electronic scratchcard game that provides them with the same level of enjoyment experienced when playing a physical scratchcard lottery ticket.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, devices, and non-transitory computer readable storage media for providing an electronic lottery scratchcard game. In particular, disclosed are electronic Hidden Object Puzzle games (hereinafter referred to as "Hidden Object game") that combines the existing lottery mechanic of scratchcard games with the existing social genre of Hidden Object games. In a traditional scratchcard puzzle, a series of covered squares are scratched by the player to reveal symbols such as letters of the alphabet. Specific combinations of symbols such as words award monetary prizes.

In a Hidden Object game, a graphical user interface contains a game with a puzzle and a scene. The scene contains a number of hidden objects that are blended or camouflaged into the background. The hidden objects conceal or cover up symbols associated with the game. The puzzle comprises puzzle symbols. The challenge for the user is to locate these hidden objects and mark them with an input device such as the touchscreen of an electronic device or the mouse of a computer.

In some embodiments, an animation is played when the hidden objects are located and marked with an input device and a concealed symbol is revealed. If the revealed symbol is present in the puzzle symbols of the puzzle associated with a scene of the game, the corresponding puzzle symbol on the puzzle is activated and illuminated to illustrate that the symbol has been recognized in the game potentially triggering a monetary reward.

A counter displays the number of remaining hidden objects. In some embodiments, play continues until all hidden objects have been marked, at which point the final prize amount is totaled. If the player cannot or does not wish to mark any more hidden objects, an AutoFind button reveals remaining hidden objects in the scene.

The composition of the puzzle and the scene may be thematically related. For example, the words in the crossword may relate to the contents of the scene. The scene may contain additional bonus objects unrelated to the puzzle that trigger a bonus game or additional prize.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
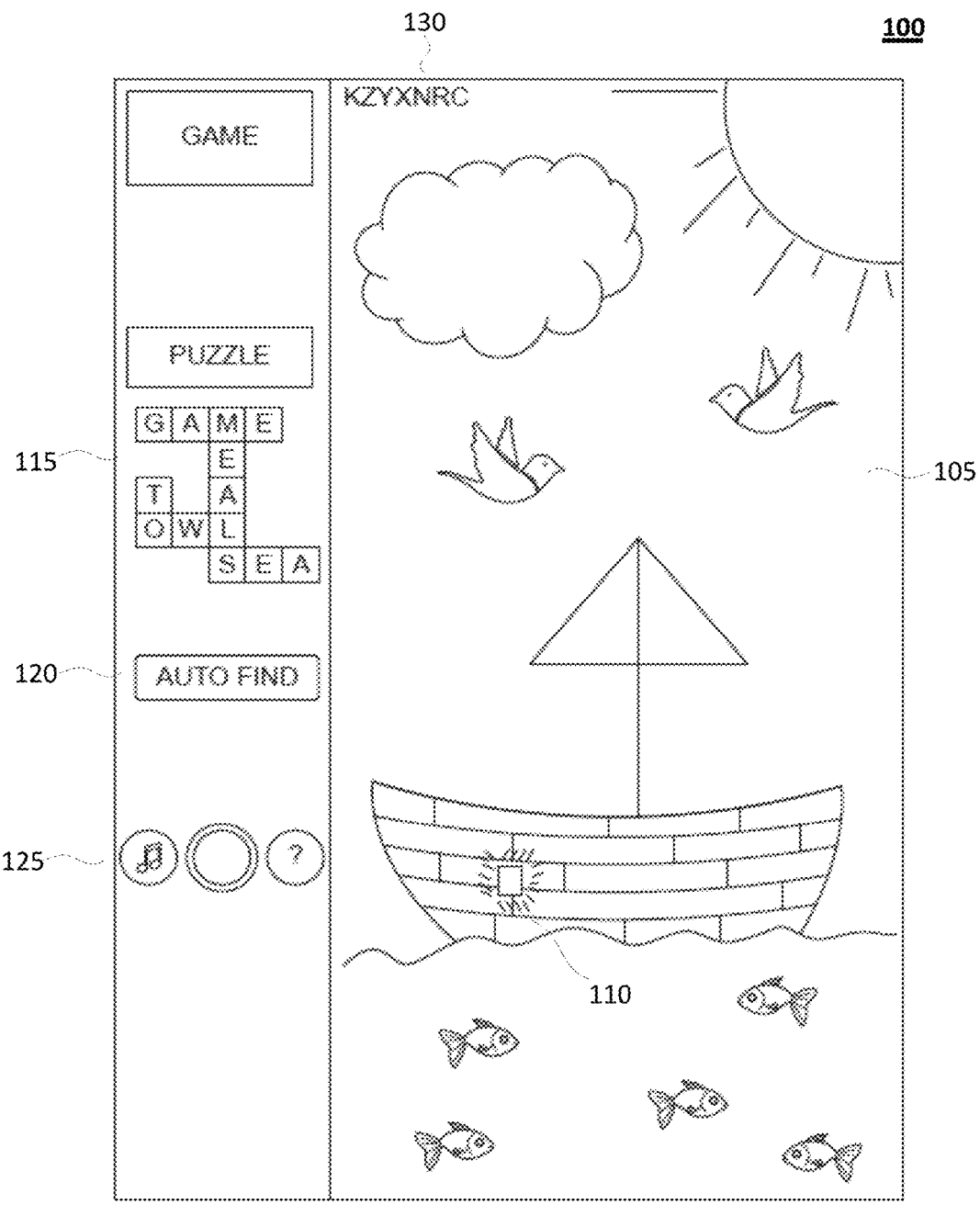
FIG. 1 illustrates an example game structure with which the game is played.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

Methods, systems, devices, and non-transitory computer readable storage media described herein allow a user to play an electronic lottery scratchcard game. In particular, disclosed are electronic Hidden Object Puzzle games (hereinafter referred to as "Hidden Object game") that combine the existing lottery mechanic of scratchcard games with the existing social genre of Hidden Object games. Traditionally, lottery scratchcards consist of a series of squares covered with latex that are scratched off by the player to reveal symbols such as letters of the alphabet or numbers. Specific combinations of symbols such as words award monetary prizes. The revealed symbols are matched against symbols present on a puzzle of the scratchcard to determine whether or not the lottery ticket is a winning ticket.

In a Hidden Object game, a graphical user interface contains a game with a puzzle and a scene. The scene contains a number of hidden objects that are blended or camouflaged into the background. The hidden objects conceal or cover up symbols associated with the game. The puzzle comprises puzzle symbols. The challenge for the user is to locate these hidden objects and mark them with an input device such as the touchscreen of an electronic device or the mouse of a computer.

In some embodiments, an animation is played when the hidden objects are located and marked with an input device and a concealed symbol is revealed. If the revealed symbol is present in the puzzle symbols of the puzzle associated with a scene of the game, the corresponding puzzle symbol on the puzzle is activated and illuminated to illustrate that the symbol has been recognized in the game potentially triggering a monetary reward.

A counter displays the number of remaining hidden objects. In some embodiments, play continues until any one or combination of events has occurred: all hidden objects have been selected, puzzle symbols have been activated and illuminated that spell a specific word or combination of words, a puzzle has been solved, a point total has been tallied, a final prize amount is totaled, and other possible endings that have been contemplated. If the player cannot or does not wish to mark any more hidden objects, a command may be invoked (such as clicking an "AutoFind" button) that reveals all remaining hidden objects in the scene.

The composition of the puzzle and the scene may be thematically related. For example, the words in the crossword may relate to the contents of the scene. The scene may contain additional bonus objects unrelated to the puzzle that trigger a bonus game or additional prize.

As used herein, the term "user" shall be considered to mean a user of an electronic device(s). Actions performed by a user in the context of computer software shall be considered to be actions taken by a user to provide an input to the electronic device(s) to cause the electronic device to perform the steps embodied in computer software. In some embodiments, an action performed by a user may include accessing a web page.

As used herein, the term "hidden object" shall be construed to mean an object camouflaged and blended into the scene of a game. The term "puzzle symbol" shall be construed to mean a symbol that is present on the puzzle of a scene of a game. The term "concealed symbol" shall be construed to mean a symbol concealed or covered up by a hidden object within a scene of the game. The term "revealed symbol" shall be construed to mean a symbol previously concealed by a hidden object of a scene that is displayed after the hidden object is selected.

FIG. 1 illustrates an example game structure 100 with which the game is played. Example game structure 100 comprises a scene 105 and a puzzle 115. The scene comprises a background and hidden objects 110 wherein the hidden objects are camouflaged and blended within the background of the scene to appear as part of the background. A user may select the hidden objects present on the graphical user interface with an input device, such as a mouse or a touch screen. The puzzle 115 comprises puzzle symbols such as letters of the alphabet or numbers arranged to form words or number strings, although other types of puzzles may be used in various embodiments. For example, in some embodiments, the puzzle may comprise graphics such as in a picture puzzle wherein the puzzle symbols are pictures or images as opposed to letters of the alphabet or numbers. Upon selection of the hidden object 110, the selected hidden object 110 reveals a concealed symbol which can be present in the puzzle 115. If the symbol revealed from the selected hidden object 110 is not present in the puzzle symbols of the puzzle 115, the symbol is simply revealed and listed in the top left corner of the scene 130. An AutoFind button 120 is present on the graphical user interface which reveals all hidden objects available for a given scene. The AutoFind button can be selected by the user, for example when the user either can not find the remaining hidden objects or does not wish to find the remaining hidden objects. Music and help buttons 125 can be toggled on and off by a user to either adjust the musical settings (i.e. music only, sound only, music and sound together) and the help settings (i.e. how to play and in game assistance).

Figure 2A:
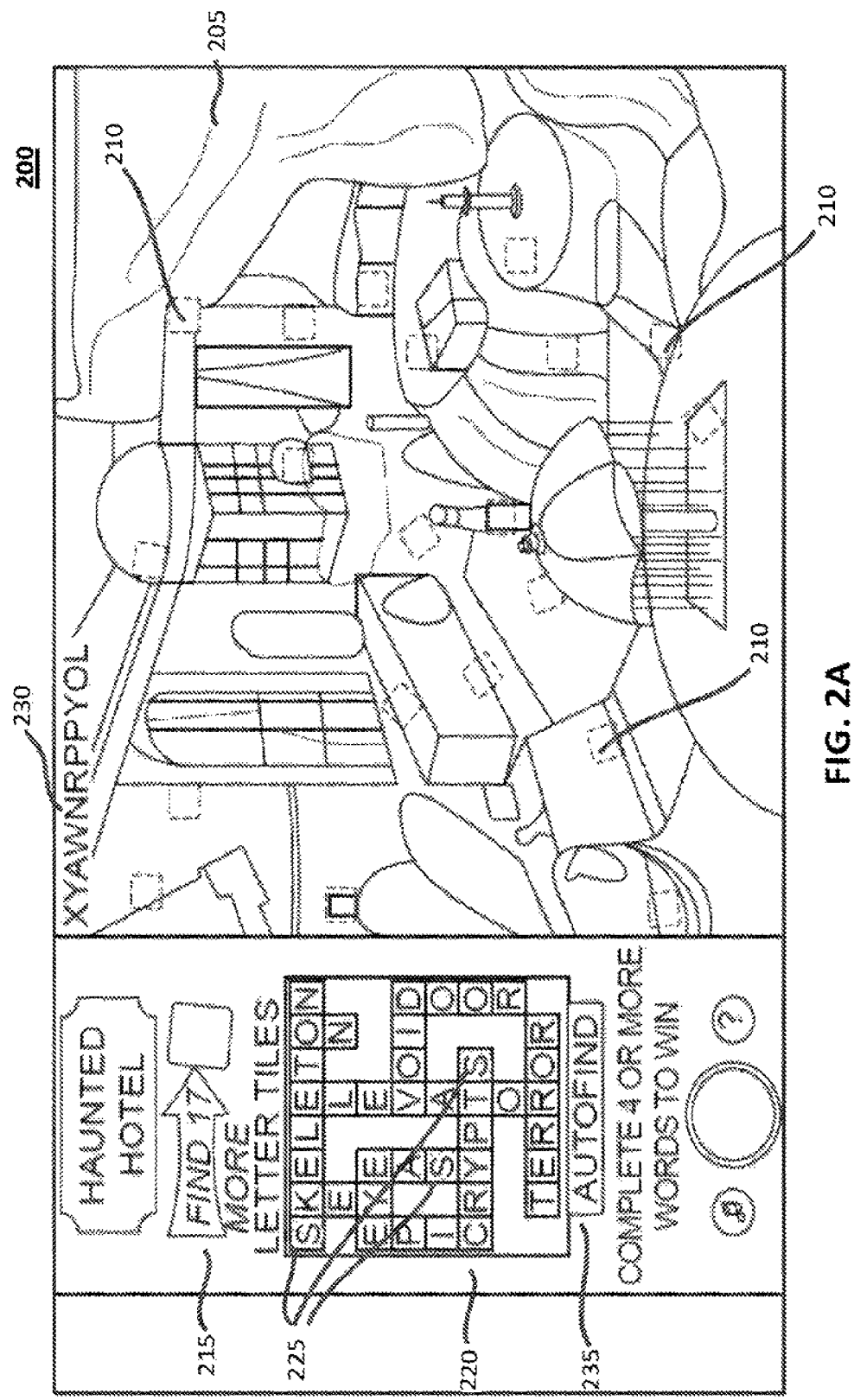
FIGS. 2A-2B illustrate an example game.

FIG. 2A illustrates an example game 200. The Hidden Object game 200 combines an existing lottery mechanic of the scratchcard puzzle with the existing social genre of Hidden Object games. In a traditional scratchcard puzzle, a series of covered squares are scratched by the player to reveal symbols such as letters of the alphabet. Specific combinations of symbols such as words award monetary prizes.

In a Hidden Object game, a scene contains a number of hidden objects 210 that blend into the background. The challenge is to locate the hidden objects 210 and mark them with an input device such as a touchscreen or mouse. These games are traditionally played for entertainment and have no wager or monetary reward.

In the present technology, both aspects of the lottery scratchcard and the Hidden Object game are combined in the same example game screen shown in FIG. 2A. The puzzle 220 is shown with the set of puzzle symbols forming combinations. Puzzle symbols 225 on the puzzle that have been revealed from the hidden object portion are marked in a different color. In this case the letter "S" has been revealed and the three occurrences of "S" in the puzzle are colored. In some embodiments, puzzle symbols that have been revealed from the hidden object portion are images or graphics as opposed to letters of the alphabet or numbers. For example, in a picture puzzle, the puzzle can comprise puzzle symbols such as graphics or images and the hidden objects can conceal symbols which are graphics or images that correspond to the puzzle symbols.

In some embodiments, the puzzle game is a grid of interlocking words forming a crossword pattern, where each hidden object in the scene conceals one letter of the alphabet. The letter may or may not have a corresponding match in the crossword, and the goal is to complete as many words as possible to award a prize value.

In some embodiments, the puzzle game consists of a set of numbers paired with a set of prize values. Each hidden object in the scene conceals one number. The number may or may not have a corresponding match in the puzzle. If the number does match, the corresponding prize value is awarded to the user.

In some embodiments, the puzzle game consists of a Bingo Board with the usual 5×5 grid of numbers. Each hidden object in the scene conceals one call number, which may or may not have a corresponding match on the board.

The goal is to complete a predetermined pattern such as lines or corners to award a prize value.

In some embodiments, the hidden object image 210 is also on the screen at the same time as depicted on the right side of FIG. 2A. The player must use their input device to mark the locations of a number of hidden objects 210, which are concealed in random locations of the image and are colored such that they blend into the background. In some embodiments, the hidden objects may be translucent tiles that are overlaid onto several portions of the scene. In this scenario, the translucent tiles are difficult for the user to detect as they blend in with images in the scene. In some embodiments, the hidden objects may be shaped to match the contour of a particular area of the scene to further blend the hidden objects into the scene. In some embodiments, the hidden objects may be images or objects that physically appear within the scene. In this scenario the hidden objects are not difficult to find because they are blended within the scene, rather the challenge is for the user to determine which images within the scene are hidden objects and which images within the scene are only part of the scene background. Hidden objects 210 appear in FIG. 2A with dashed lines to represent to illustrate the fact that hidden objects 210 are blended into the background of scene 205. However, this is for illustration purposes only and during actual game play hidden objects 210 blend into the scene to appear as part of the scene making it challenging for a user to identify the hidden objects 210 location.

In some embodiments, when a hidden object 210 is marked, an animation plays and the symbol is revealed. If a matching symbol is present in the puzzle, the player can receive a monetary award. If the matching symbol is not present, the symbol is simply revealed and listed in the top left corner of the scene 230. A counter 215 displays the number of remaining hidden objects. In some embodiments, play continues until all hidden objects have been marked, at which point the final prize amount is totaled. An AutoFind button 235 can be present on the graphical user interface. The user can select this button with an input device such as a mouse or touchscreen to reveal and award all remaining hidden objects 210 in the scene. The player may press this button if they feel that they are "stuck" or unable to locate any more objects and still want to complete the scene. Alternatively, the user may select the AutoFind button 235 to rapidly play a given scene by revealing all the hidden objects 210 and their rewards.

Figure 2B:
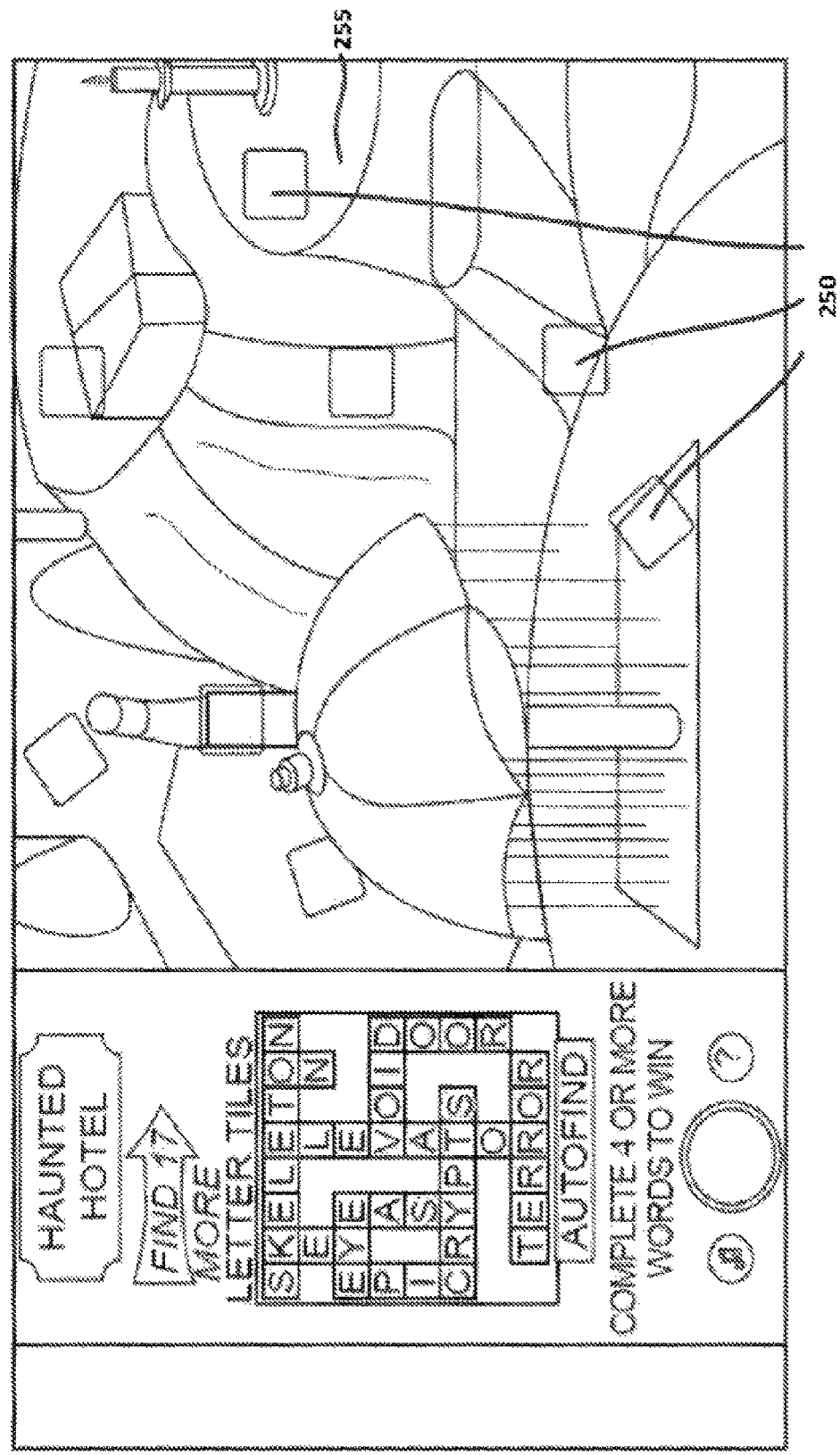

FIG. 2B further illustrates example game 200 by magnifying a particular section of example game 200. As discussed above, hidden objects 250 are blended within the background of the scene 255 to appear as part of the background of the scene 255. FIG. 2B illustrates this point by magnifying a section of the scene and displaying a smaller number of hidden objects 250 dispersed throughout the scene 255.

In some embodiments, the hidden objects can be translucent tiles overlaid onto the background of the scene 255. As translucent tiles, the hidden objects 250 appear the same color and texture of the background they are overlaid on. In some embodiments, hidden objects 250 can be colored and textured to blend in with the background of scene 255. In the embodiments disclosed, the hidden objects 250 are blended within the background to make it challenging for the user to locate the hidden objects within the scene 255.

Figure 3:
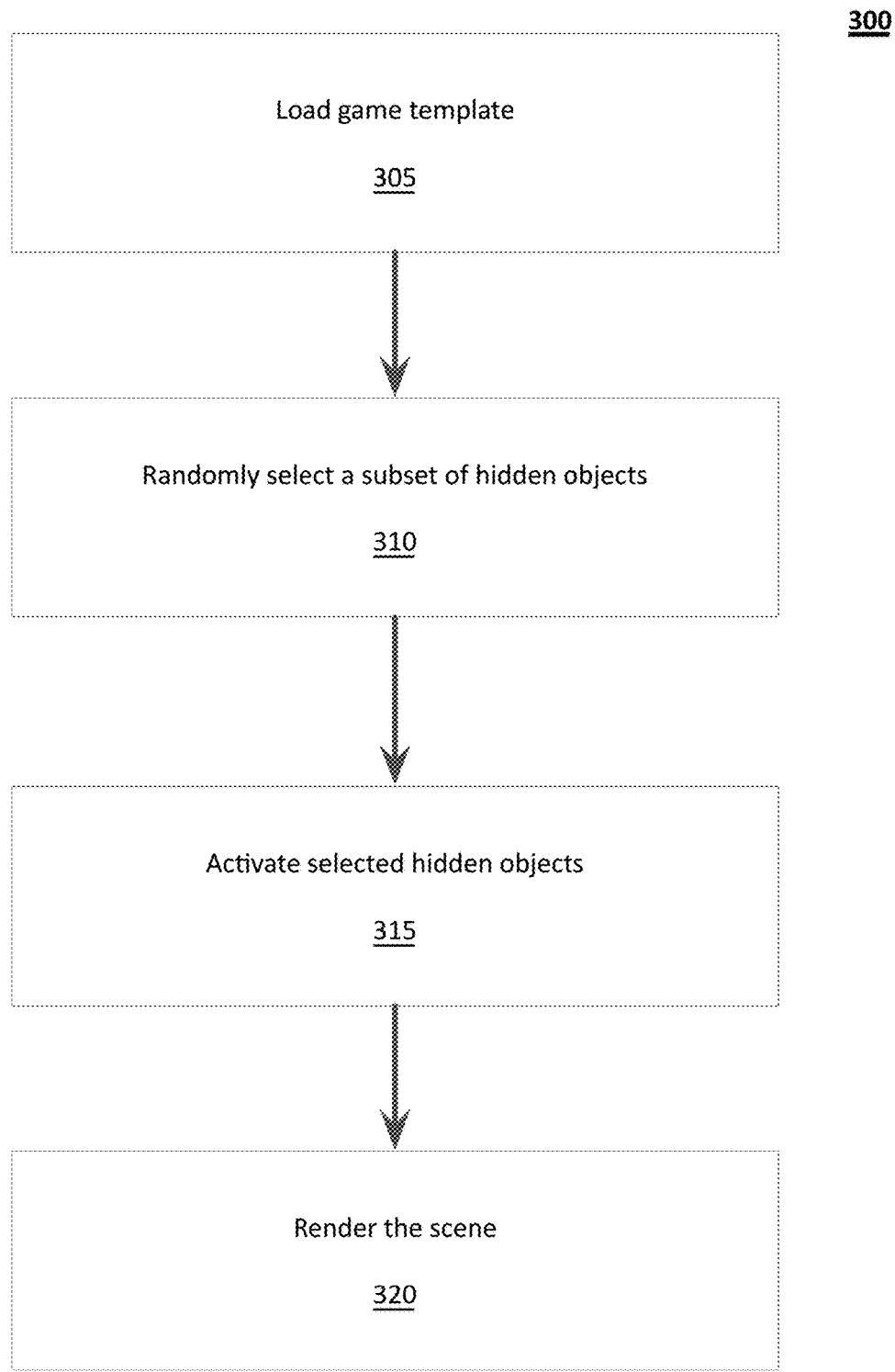
FIG. 3 illustrates an example method embodiment of how the game is configured.
Figure 4:
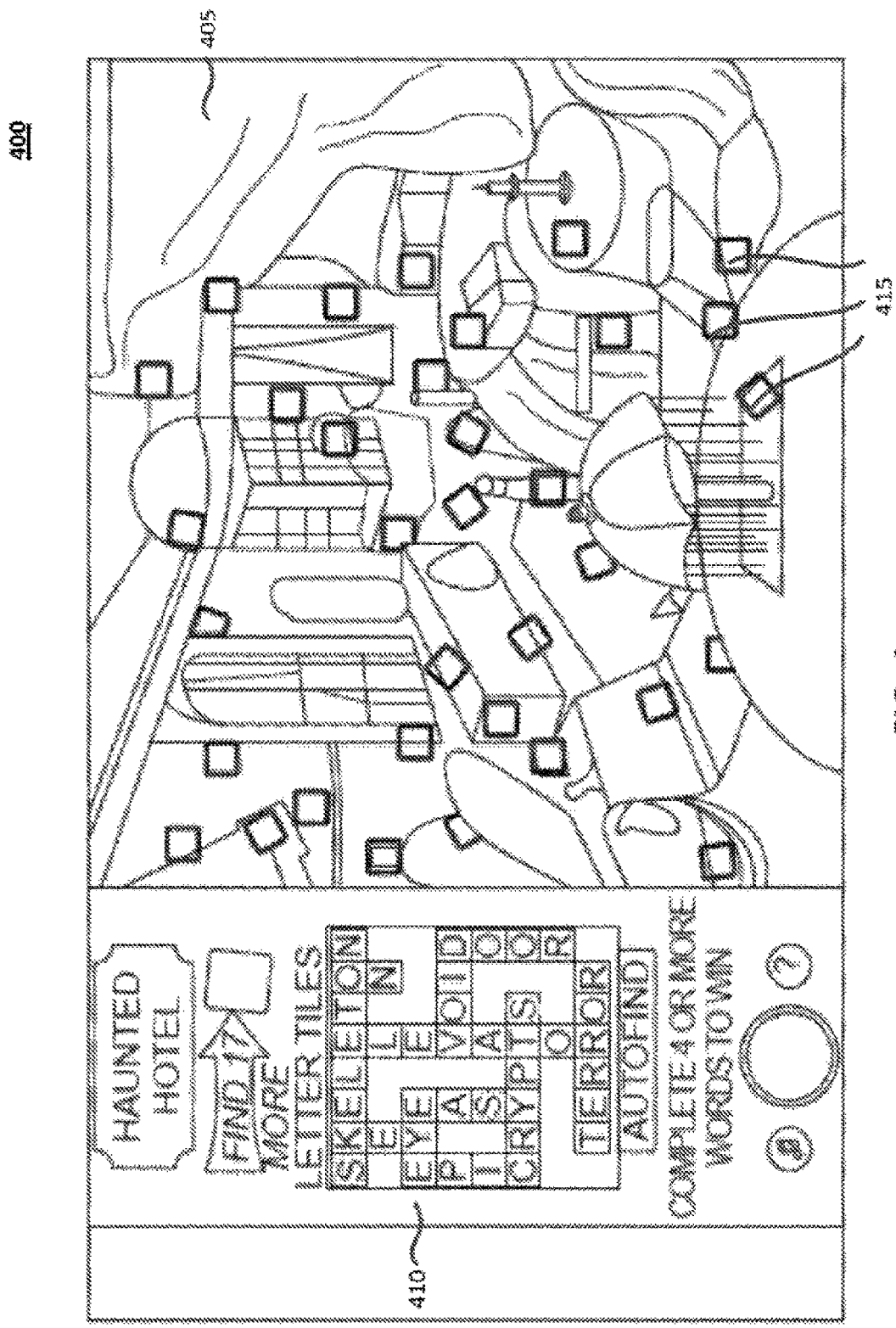
FIG. 4 illustrates an example configuration of a background graphic of the game.

FIG. 3 illustrates an example method embodiment 300 of how the game is configured. The method begins at block 305 where the game is configured to load a game template. In some embodiments, the game template loaded comprises a puzzle and a scene of a game. FIG. 4 illustrates an example configuration of a background graphic of the game loaded comprising a puzzle 410 and a scene 405. The hidden object scene 405 is constructed randomly each time to give the player a different challenge with each session.

At block 310 of FIG. 3, the method continues to randomly select a subset of hidden objects from among the total number of hidden objects available in the scene. In some embodiments, the number of preconfigured hidden object locations 415 available in the scene exceeds the number of hidden objects activated for a scene of the game. For example, in FIG. 2A, a scene of the game may only require 20 hidden objects 210 to be activated while 34 preconfigured hidden object 415 locations are available as depicted in FIG. 4. In some embodiments, the number of hidden objects activated for a scene will exceed the number of puzzle symbols present on the puzzle of a scene of a game. This allows the hidden objects to conceal both puzzle symbols and symbols that are not present on the puzzle. In some embodiments, the game is configured to have many possible hidden objects 415 as depicted in FIG. 4, only some of which are selected by an algorithm. The hidden objects 415 selected are the hidden objects exposed in the game.

At block 315, the hidden objects selected for a particular game are activated. For example, the scene 405 of FIG. 4 shows all 34 possible positions of hidden objects 415 in the scene. In FIG. 2A, 20 hidden objects 210 are required so a random 20 of these hidden objects 415 are randomly selected and activated to be present in the scene of the game played and the rest completely hidden from the scene and unavailable for the user to select.

In some embodiments, the hidden objects activated for use in a particular game are associated with a particular symbol. The hidden object can conceal the symbol only to be revealed upon a user finding and selecting the hidden object with an input device such as a mouse, cursor, or touchscreen.

In some embodiments, the hidden objects activated for use in a particular game are not associated with a particular symbol. Rather, the order in which the symbols are revealed is predetermined such that it makes no difference which hidden object the user finds and selects first because the symbol revealed would be the same for either hidden object selected.

In some embodiments, the game is completely deterministic, with no elements of player skill. The ticket is predetermined to be a winner or a loser as is usual for a lottery ticket, and then the puzzle is constructed in such a way to provide the desired outcome.

The shape, words and letters of the puzzle for the crossword embodiment can be generated through a puzzle generation algorithm. In some embodiments, the shape of the puzzle is built by creating an overlapping series of lines based on a formula set by the designer. For example, the series of lines could be six 4-letter words, two 5-letter words, and two 6-letter words. The word list used to fill the series of lines can be themed to the scene. In some embodiments, an algorithm may be used to find a set of words that overlap properly and have the correct lengths. In some embodiments the puzzle for the scene of a game is pre-configured such that the algorithm does not have to create the grid.

Once the words of the crossword puzzle have been selected, the puzzle generation algorithm can determine which words will be filled in order to provide the desired win or loss. The puzzle generation algorithm can also determine which letters are necessary to fill the target words while also assigning additional letters to the sequence such that no undesired words are filled in. In some embodiments, these additional letters may match no letters in the puzzle. In some embodiments, these additional letters may match but not fully complete a word. The puzzle generation algorithm can randomly order the sequence of letters. In some embodiments, when the user selects the first hidden object, the first letter in the sequence will be revealed and so on. Under this construction, it makes no difference as to which hidden object the user selects first as the order in which the symbols are revealed is pre-determined. In some embodiments, letters may be affixed to certain hidden objects such that the order in which the letters are revealed is determined by which hidden objects the user selects first. In either construction, in some embodiments, the game is completely deterministic, with no elements of player skill Hence, the ticket or scene is pre-determined to be a winner or a loser and the user cannot effect this outcome by the manner in which the user selects the hidden objects and reveals the associated letters.

An analogous method would be used for other puzzle types such as the Bingo Board and set of numbers paired. In general the puzzle is constructed first, and then the appropriate symbol sequence is formed and the hidden objects are each mapped to a symbol from the sequence when revealed by the user.

Additionally, the composition of the puzzle may be thematically related. For example, in the crossword embodiment, the words in the crossword may relate to the contents of the scene. Lastly, in some embodiments, the scene may contain additional bonus objects unrelated to the puzzle that trigger a bonus game or additional prize.

The method continues to block 320, where the scene of the game and an associated puzzle are rendered in a display. The scene consists of hidden objects which conceal symbols, some of which can be present in puzzle symbols of the puzzle associated with the scene of the game.

Figure 5:
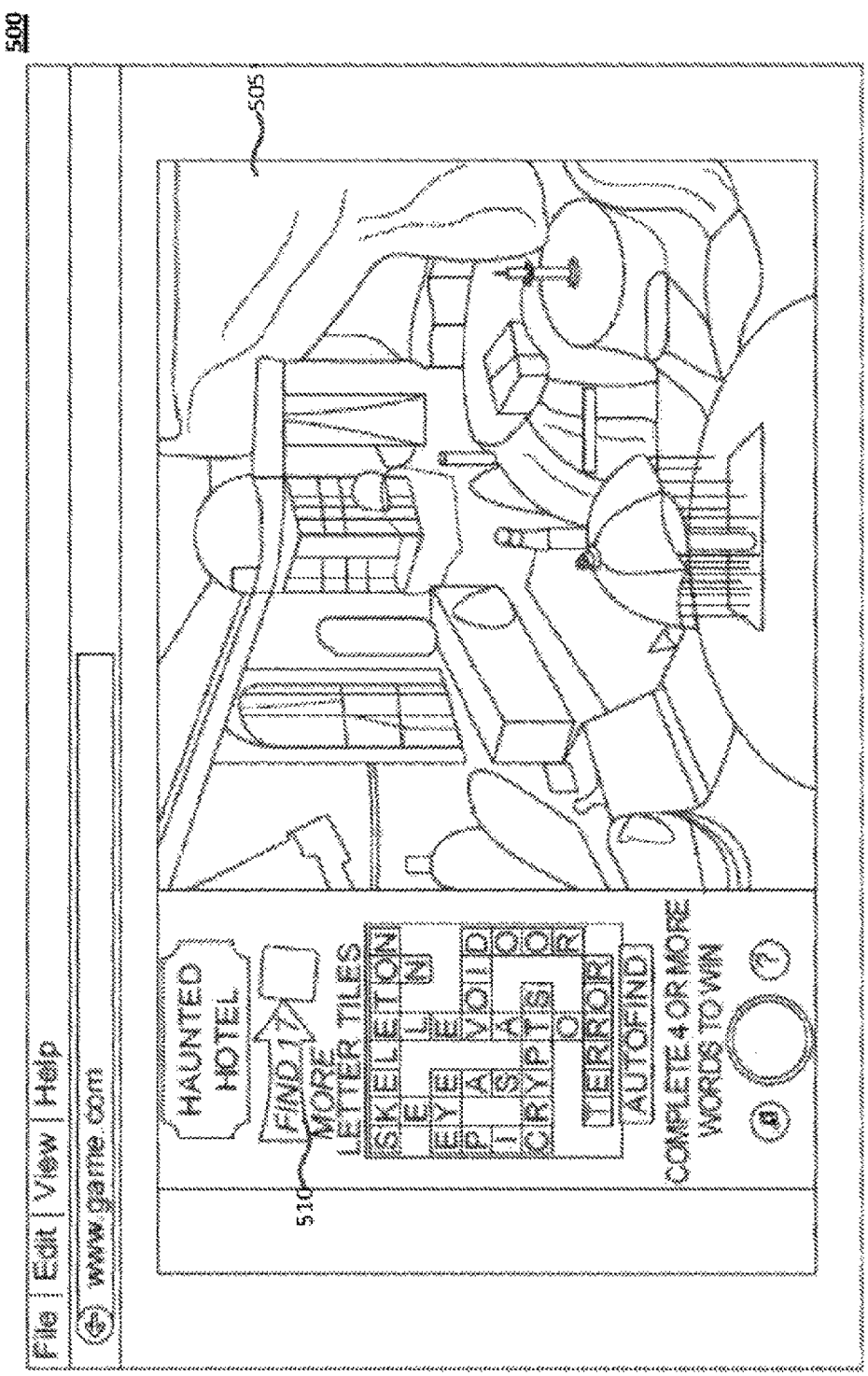
FIG. 5 illustrates an example embodiment of a user interface on which a game structure is displayed.

FIG. 5 illustrates an example embodiment of a user interface 500 on which a game structure is displayed. The user interface can display a scene 505 of the game and a puzzle 510 of the game. In some embodiments, the user interface can also include buttons for AutoFind, music, sound effects, to exit the game, and help. In some embodiments the user interface includes a game information overlay which may include information about the game, such as how many points or how much money a user wins if different combinations of symbols are revealed. The game information overlay may also keep track of how many points or how much money a user has accumulated overall or within a scene of the game. The game information overlay may also include widgets which allow a user to pay money to play a scene of the game. A game information overlay may also show a user's balance and how many remaining tickets or scenes a user has left.

User interface 500 may be included on an electronic gaming machine used to wager money, a computer, a smart phone, a laptop, a wearable computer, etc. In some embodiments the game may be downloaded to a computer or electronic device as a native application. In some embodiments the game may be available on a web browser and played online. In some embodiments, the user interface 500 may be displayed on a touch screen. In some embodiments, a cursor may be used to manipulate different elements of the game, such as by clicking the hidden objects blended within the background 505 of the scene.

Figure 6:
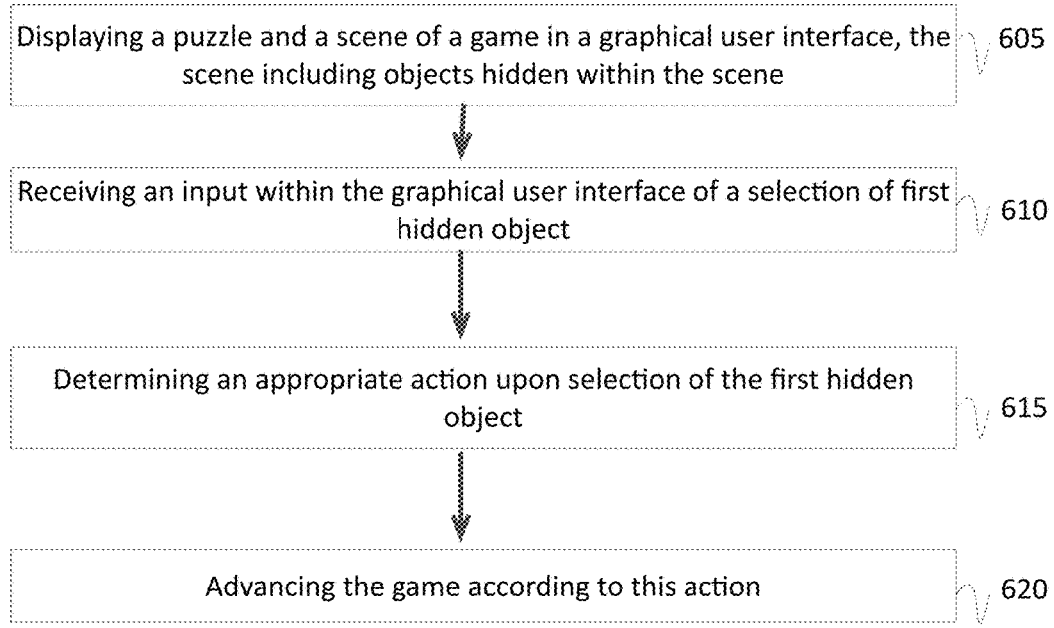
FIG. 6 illustrates an example method embodiment of how the game is played.

FIG. 6 illustrates an example method embodiment of how the game is played. It should be understood that example method embodiments are shown for example only. Additional or fewer steps may be added or removed from the method embodiments shown herein. In addition, in some embodiments, portions of the described method diagram shown in FIG. 6 may be in a different order, in parallel, or not performed at all.

As shown, the method begins at block 605, where a puzzle and a scene of a game are displayed in a graphical user interface wherein the scene includes hidden objects and the puzzle comprises puzzle symbols. The hidden objects can be blended or camouflaged into the background of the scene to appear as part of the scene itself. In some embodiments the puzzle is a crossword puzzle. In other embodiments the puzzle is a bingo board or numbers paired together.

At block 610 of method 600 an input is received within the graphical user interface of a selection of first hidden object. In some embodiments the input may be a click of a mouse, a user touching the touchscreen of an electronic device, or a cursor selecting the hidden object. At block 615 of method 600 an appropriate action is determined upon selection of the first hidden object. In some embodiments it is determined that the revealed symbol does not appear in the puzzle symbols of the puzzle. In this scenario the appropriate action determined is to list the revealed symbol in the top left corner of the scene 230 because the symbol does not appear in the puzzle symbols of the puzzle. In some embodiments, it may be determined that the revealed symbol does appear in the puzzle symbols of the puzzle. In this scenario the appropriate action determined is to illuminate the revealed symbol corresponding to the puzzle symbol of the puzzle. At block 620 of method 600, the game is advanced according to the appropriate action determined at block 615. In some embodiments, the game is advanced by awarding monetary prizes or points to the user because the revealed symbol was present in the puzzle symbols of the puzzle and a word was formed by the inclusion of the revealed symbol. In some embodiments, the game is advanced by not awarding monetary prizes or points to the user because the revealed symbol was not present in the puzzle symbols of the puzzle. Rather, the game advances by waiting for the user to find and select a remaining hidden object within the scene. In some embodiments, the game is advanced by conveying to the user that no hidden objects remain in the scene and that the current ticket is a loser ticket.

Figure 7:
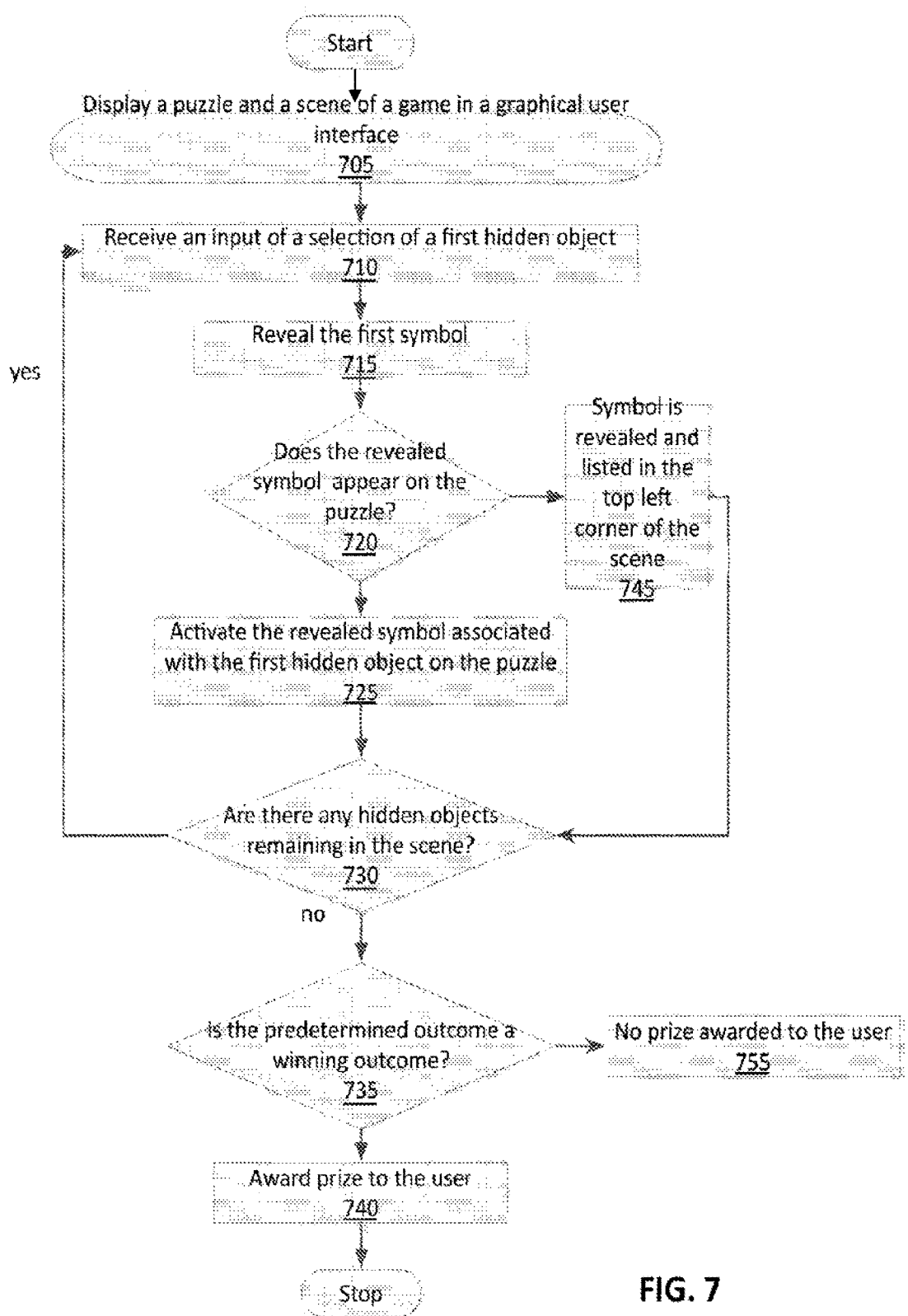
FIG. 7 illustrates an example flowchart of how the game is played.

FIG. 7 illustrates an example flowchart of how the game is played. The flowchart begins at step 705 where a puzzle and a scene of a game are displayed on a graphical user interface. The flowchart continues to step 710 where the game receives an input of a selection of a hidden object by an input device of a user. A concealed symbol is revealed at step 715 of the flow chart upon selection of the first hidden object in the scene. At step 725, if the revealed symbol is a symbol that is present in the puzzle symbols of the puzzle of the scene being played, the revealed symbol is activated on the puzzle to reflect that the symbol has been discovered. In some embodiments, an animation plays when the hidden object is selected and the symbol on the puzzle is illuminated to reflect that the symbol is activated. If the symbol revealed is not a symbol present in the puzzle symbol of the puzzle of the scene being played, the symbol is revealed and is listed on the top left corner 230 of the scene as depicted in FIG. 2A.

Figure 8A:
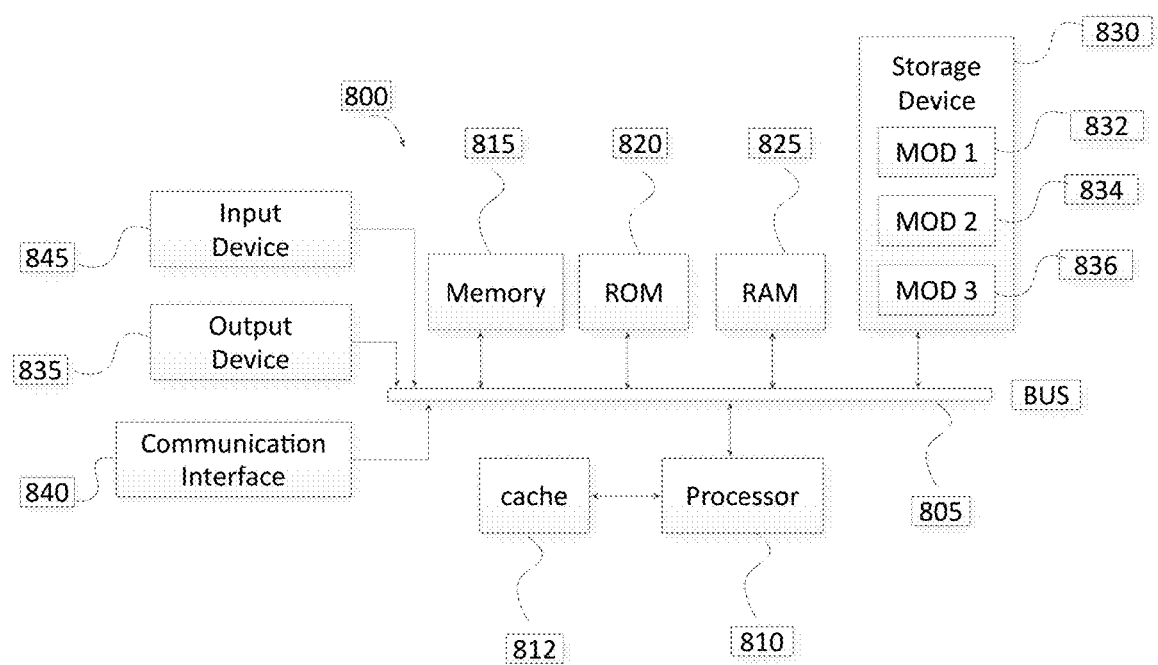
FIGS. 8A-8B illustrate example electronic environments, in accordance with various embodiments.
Figure 8B:
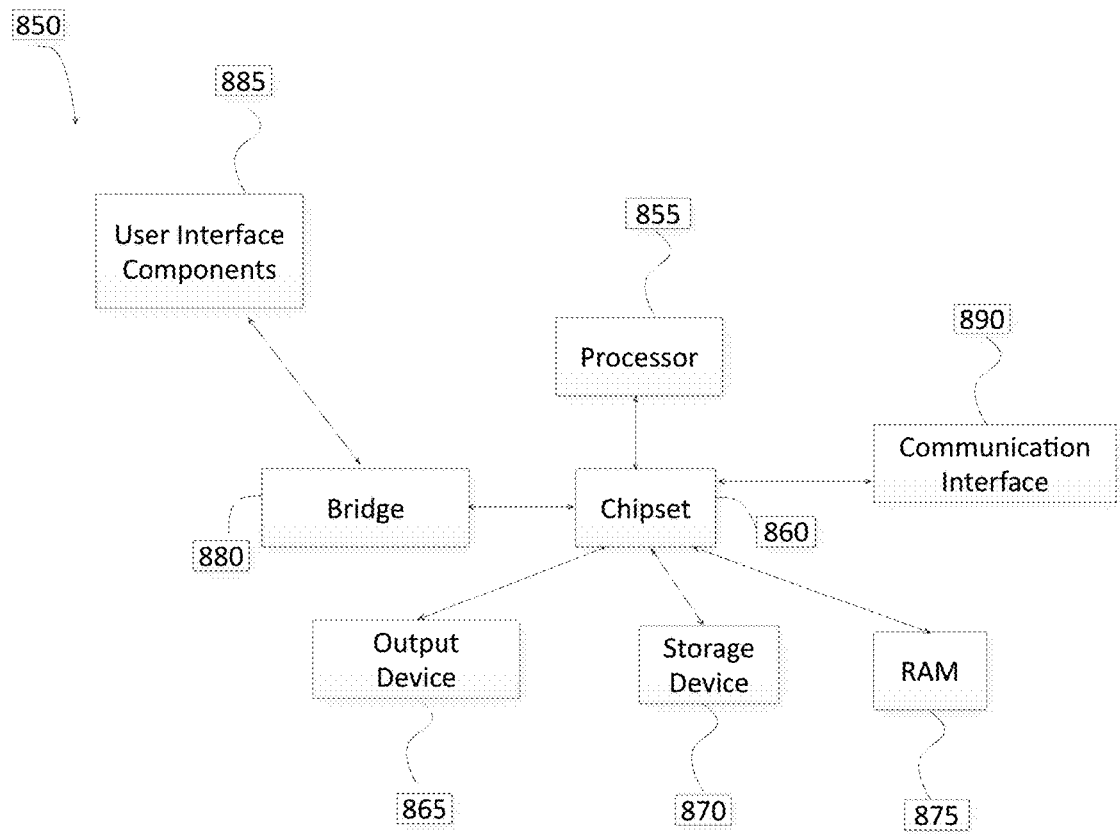

In either scenario, the flowchart continues to step 730 to determine whether there are any more hidden objects that remain unselected in the scene. If yes, the game continues until all hidden objects are selected and associated symbols are revealed. If all the hidden objects have been selected and associated symbols revealed, the flowchart continues to determine whether the predetermined outcome of the game was a winning outcome 735. In some embodiments, a winning outcome results in a user receiving a monetary award 740. In some embodiments, a winning outcome results in a user being awarded points 740 redeemable for prizes. In some embodiments, a winning outcome results in a code being displayed to a user which a user can redeem for cash or prizes. If the predetermined outcome of the game is not a winning outcome, the user is not awarded any monetary prizes or points FIG. 8A, and FIG. 8B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 838 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 838 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 808, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 880 that can control input to and output from processor 855. In this example, chipset 880 outputs information to output 885, such as a display, and can read and write information to storage device 870, which can include magnetic media, and solid state media, for example. Chipset 880 can also read data from and write data to RAM 875. A bridge 880 for interfacing with a variety of user interface components 885 can be provided for interfacing with chipset 880. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 880 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include electronic gaming machines, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   displaying a puzzle and a scene of a game in a graphical user interface to a user, the scene including hidden objects within the scene;
   receiving an input within the graphical user interface of a selection of a first hidden object;
   determining an appropriate action upon selection of the first hidden object;
   advancing the game according to the action;
   wherein the hidden objects are camouflaged or blended within a background of the scene but discernable so that the user is challenged to locate and select the hidden objects within the scene, each hidden object concealing a symbol, at least certain of the symbols corresponding to a puzzle symbol included in the puzzle on the graphical user interface; and
   wherein the game comprises a lottery game having a pre-determined outcome.

2. The computer-implemented method of claim 1, wherein the determining an appropriate action comprises:
   activating the revealed symbol associated with the first hidden object on the puzzle in the graphical user interface when the revealed symbol corresponds to a puzzle symbol included in the puzzle on the graphical user interface.

3. The computer-implemented method of claim 1, further comprising:
   generating a reward if the revealed symbols corresponding to a puzzle symbol included in the puzzle on the graphical user interface satisfy a reward requirement.

4. The computer-implemented method of claim 1, wherein a total number of the hidden objects in the scene exceeds a total number of the puzzle symbols, and at least certain of the symbols concealed by the hidden objects do not correspond to one of the puzzle symbols.

5. A non-transitory computer-readable medium storing computer executable instructions for causing a computer to perform the method comprising:
   displaying a puzzle and a scene of a game in a graphical user interface, the scene including hidden objects within the scene;
   receiving an input within the graphical user interface of a selection of a first hidden object;
   determining an appropriate action upon selection of the first hidden object;
   advancing the game according to the action;
   wherein the hidden objects are camouflaged or blended within a background of the scene but discernable so that the user is challenged to locate and select the hidden objects within the scene, each hidden object concealing a symbol, at least certain of the symbols corresponding to a puzzle symbol included in the puzzle on the graphical user interface; and
   wherein the game comprises a lottery game having a pre-determined outcome.

6. The computer-readable medium of claim 5, wherein the determining an appropriate action comprises:
   activating the revealed symbol associated with the first hidden object on the puzzle in the graphical user interface when the revealed symbol corresponds to a puzzle symbol included in the puzzle on the graphical user interface.

7. The computer-readable medium of claim 5, wherein the method further comprises:
   generating a reward if the revealed symbols corresponding to a puzzle symbol included in the puzzle on the graphical user interface satisfy a reward requirement.

8. The computer-readable medium of claim 5, wherein the game has a plurality of the hidden objects throughout the scene, the method further comprising randomly activating only certain ones of hidden objects for play of the game.

* * * * *